United States Patent

[11] 3,579,992

[72] Inventors Louis A. Urban
 Granby, Conn.;
 Charles F. Stearns, East Longmeadow, Mass.
[21] Appl. No. 788,856
[22] Filed Jan. 3, 1969
[45] Patented May 25, 1971
[73] Assignee United Aircraft Corporation
 East Hartford, Conn.

[54] POWER PLANT VARIABLE GEOMETRY CONTROL
 10 Claims, 5 Drawing Figs.
[52] U.S. Cl. ...................................................... 60/239,
 60/39.25
[51] Int. Cl. ...................................................... F02k 1/16,
 F02k 1/18
[50] Field of Search............................................ 60/39.25,
 235, 236, 237, 238, 239

[56] References Cited
UNITED STATES PATENTS

| | | | |
|---|---|---|---|
| 3,521,446 | 7/1970 | Maljanian...................... | 60/39.25 |
| 3,523,423 | 8/1970 | Young............................ | 60/239 |
| 3,529,419 | 9/1970 | Reed.............................. | 60/39.25 |
| 2,857,739 | 10/1958 | Wright.......................... | 60/238 |
| 2,912,824 | 11/1959 | Van Nest...................... | 60/39.25 |
| 2,931,168 | 4/1960 | Alexander..................... | 60/238 |
| 2,972,858 | 2/1961 | Paulick......................... | 60/238 |
| 3,091,080 | 5/1963 | Crim ............................ | 60/236 |
| 3,181,295 | 5/1965 | Pauwels........................ | 60/39.25 |
| 3,252,686 | 5/1966 | Chadwick..................... | 60/39.25 |
| 3,348,560 | 10/1967 | Stearns......................... | 60/39.25 |
| 3,472,027 | 10/1969 | Snow............................ | 60/236 |

Primary Examiner—Mark M. Newman
Attorney—Laurence A. Savage

ABSTRACT: Means for controlling the variable geometry of a gas turbine engine having a mechanism for varying the power turbine stator geometry or the gas generator exhaust nozzle geometry to achieve maximum acceleration time by matching the geometry of the engine to the acceleration and droop schedules of the fuel control.

INVENTORS
LOUIS A. URBAN
CHARLES F. STEARNS
BY Laurence A. Savage
AGENT

POWER PLANT VARIABLE GEOMETRY CONTROL

BACKGROUND OF THE INVENTION

1. Field of the Invention

This invention relates to a means for controlling the variable geometry downstream of the hot gas generator section of a gas turbine engine and particularly to a means for controlling the variable area geometry of the power turbine stator or the gas generator exhaust nozzle.

2. Description of the Prior Art

The usual method of controlling the variable area geometry of the power turbine is open loop scheduling of the variable area from power lever. This method has disadvantages in that it does not recognize engine deterioration effects or engine to engine variability, which can cause the steady-state operating line to vary widely with respect to the acceleration line; it does not permit rapid acceleration or deceleration; and the inaccuracies of open loop scheduling prevent moving the steady-state operating line as close to the acceleration line as desired for most efficient engine operation.

SUMMARY OF THE INVENTION

For efficient gas turbine engine operation it is desirable to maximize the engine thrust or power output and minimize the fuel consumption. It is inherent in the gas turbine cycle that the higher the turbine inlet temperature, the higher the thrust or horsepower output per pound of engine air flow. Also, the higher the cycle pressure ratio, the lower the specific fuel consumption. Since at any given rotational speed a gas turbine is essentially a fixed air flow machine, it is obvious that for optimum operation it should be made to operate at the highest practical turbine inlet temperature and pressure ratio at any particular speed. This may be accomplished by controlling the variable area geometry downstream of the hot gas generator section of the engine. The hot gas generator may be any of the well-known types of gas turbine engines such as an axial or centrifugal, single or split spool compressor; a heat source including a fuel burner, with or without a regenerator; and a turbine or turbines to drive the compressor. The hot gas output may go into either a free turbine with variable area nozzles to produce horsepower, or by acceleration through a variable area exhaust nozzle to produce thrust.

It is, therefore, an object of this invention to provide an improved means for controlling the variable geometry of a gas turbine engine power turbine which will allow the engine to operate in steady-state as close as is prudently possible to the acceleration schedule.

Since the engine acceleration schedules are generally chosen to limit either turbine inlet temperature (to avoid structural damage) or to limit compressor pressure ratio (to avoid surge of the compressor), it is a further object of this invention to allow the engine to operate in steady-state at the highest practical turbine inlet temperature and compressor pressure ratio at any particular turbine rotational speed by controlling the area of the turbine variable geometry.

Another object of the present invention is to provide a control for the variable area geometry of a turbine which utilizes a schedule which is readily available within the fuel control so that the requirement of generating a schedule especially for the variable area geometry control is obviated.

Another object of this invention is to base the signal which is utilized for control of the variable area geometry on any one of the well-known parameters which may be utilized to schedule acceleration fuel flow to the engine, such as $W_f/P_3$, $W_f/\delta_{1a}$ or direct sensed turbine inlet temperature, for example.

Another object of the present invention is to apply droop control to the power turbine stator variable area or to the gas generator exhaust nozzle variable area because, as will be understood by one skilled in the art, the acceleration capabilities of the engine will be increased thereby.

In accordance with the present invention, an improved closed loop turbine-type of power plant variable area geometry control is provided by control means responsive to a function of the acceleration and drop schedule provided by the fuel control which senses engine operating parameters such as turbine inlet temperature, the speed of the engine, the engine inlet temperature and the condition of the engine (i.e., whether operating in the acceleration, steady-state or deceleration mode).

In further accord with the present invention, the function of the desired turbine inlet temperature to which the control means is responsive may be based on any of the parameters commonly used for acceleration scheduling of fuel; e.g., $W_f/P_3$, $W_f/\delta_1$ or direct sensed turbine inlet temperature. The desired turbine inlet temperature is taken as a signal from the main fuel metering control as a percentage of, or difference from, the acceleration scheduled value.

In still further accord with the present invention, droop control on the area of the power turbine variable geometry is provided by droop control means in combination with the above-mentioned control means.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 5:
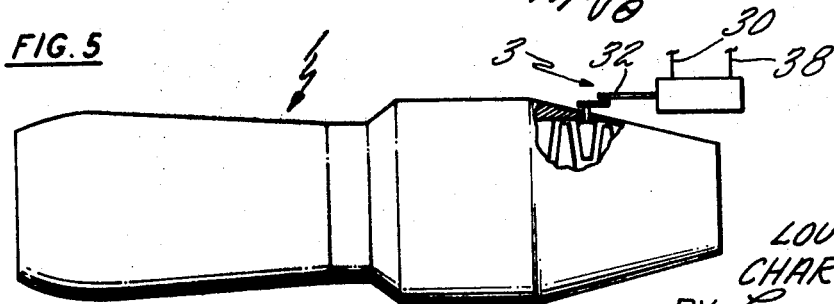
FIG. 5 is a schematic drawing of a gas turbine engine showing the location of the actuating means for positioning the variable power turbine stator geometry mechanism.
Figure 4:
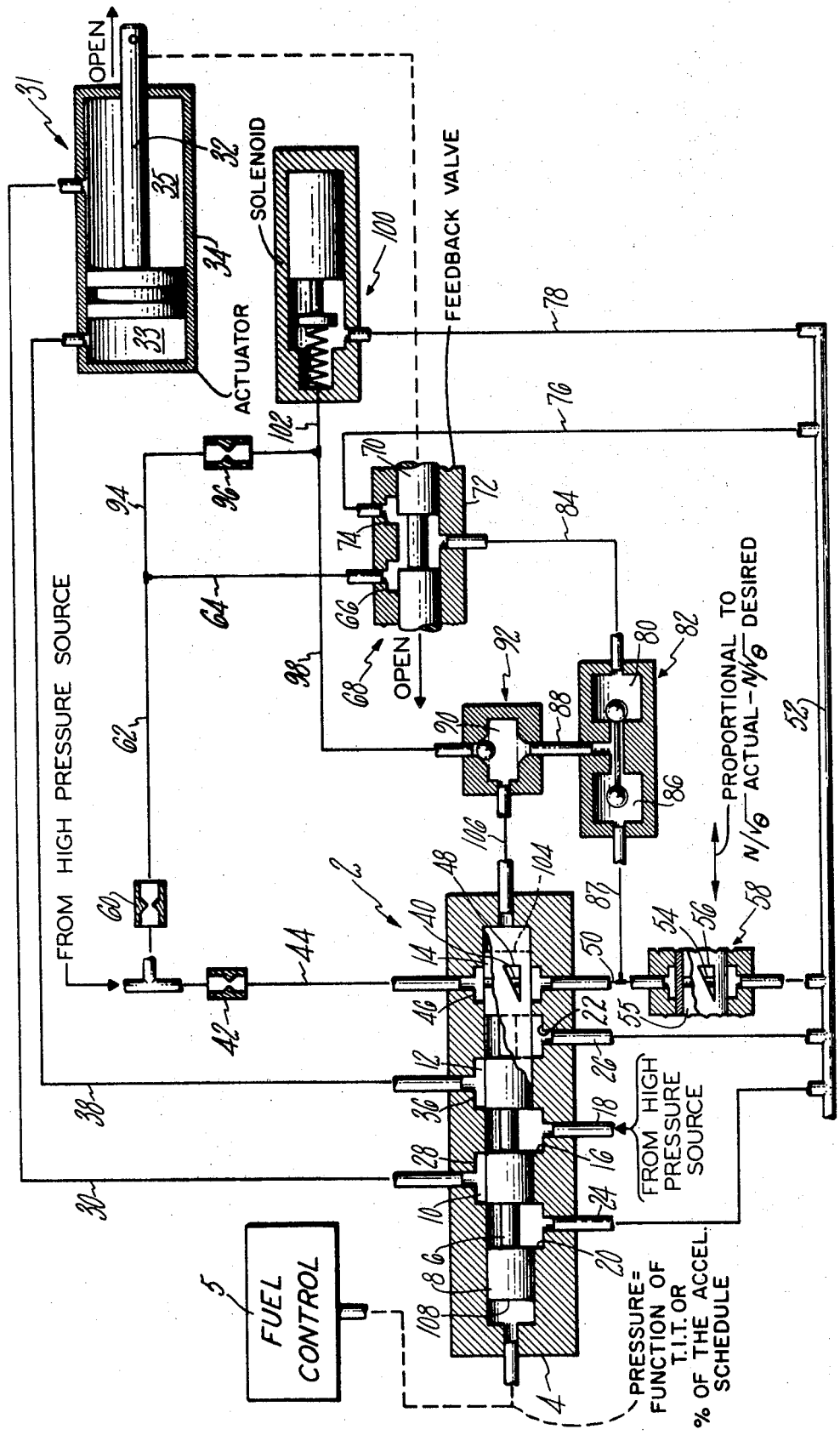
FIG. 4 is a schematic drawing of an exemplary embodiment of an improved power turbine variable geometry control in accordance with the present invention.

Referring to FIG. 4, there is shown a control valve designated generally by numeral 2, which may be any of the types of control valves well known in the fuel control art. Translatable within a housing 4 is a spool 6 having lands 8, 10, 12 and 14 thereon. A port 16 is connected to a source of fluid under high pressure, via line 18. Ports 20 and 22 are connected to drain (a low pressure source) by lines 24 and 26 respectively. Port 28 is connected, via line 30, to variable geometry actuating means 31 which may take the form of a piston 32 which is translatable within housing 34. The piston 32 is connected to a mechanism 3 (shown in FIG. 5) of any type well known in the art which varies the area of the power turbine variable geometry (shown in FIG. 5) and actuates the motion thereof. Port 36 is connected to the other side of the piston 32 by line 38.

Also disposed on the spool is an annular groove 40; high-pressure fluid flows through a fixed restriction 42, a line 44 and then into a port 46. From the port 46 the fluid flows into the groove 40, through metering window 48 and into line 50 from whence it flows to a drain line 52 after first flowing through a groove 54 and a metering window 56 in the valve 58. The valve 58 is a droop valve of the type well known in the fuel control art; the groove 54 on the spool 55 is positioned by comparing actual corrected engine speed with desired corrected engine speed. The description of the droop valve is omitted herefrom for the sake of convenience and simplicity, but a typical type of droop valve is shown in U.S. Pat. No.

3,492,814 and reference is made thereto. As will be obvious to one skilled in the art, it would only be necessary to modify droop valve 76 (shown in U.S. Pat. No. 3,492,814) by adding metering window 56 and groove 54 thereto, to obtain the droop function.

Figure 3:
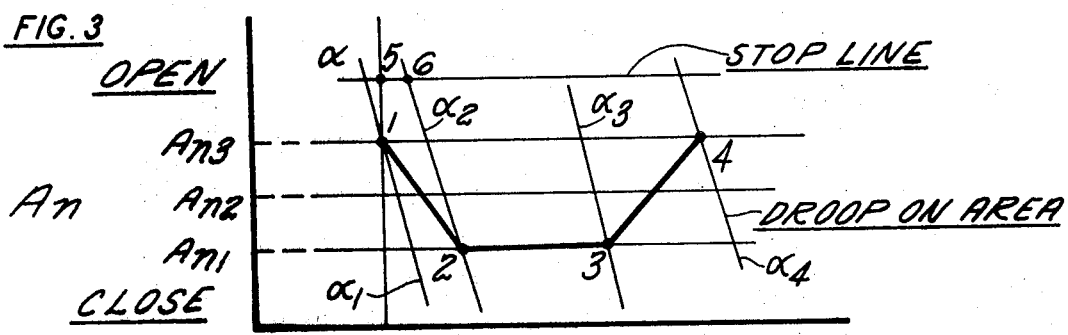
FIG. 3 is a graphical illustration of the variation of the power turbine variable geometry area over the speed range of the engine.

High-pressure fluid is also metered through a fixed restriction 60, a line 62, a line 64 and into a metering port 66 of turbine variable geometry feedback valve 68. The valve 68 is positioned in response to the position of the variable geometry control actuator piston 32. Pressure in line 84 is ported by a metering port 74 in the valve 68 to line 76. The pressure in the line 84 will be intermediate the pressures metered by the ports 66 and 74, and it is connected to a chamber 80 of a least pressure selector 82 via line 84. The least pressure selector 82 compares the pressure signal fed by line 84 with the pressure in line 50 intermediate metering window 48 and metering window 56 which is fed to a chamber 86 of the least pressure selector 82 via line 87. The least pressure selector 82 selects the lower of these two pressure signals and feeds it, via line 88, to a chamber 90 of a most pressure selector 92. Obviously, from an inspection of FIG. 3 is will be appreciated that the least pressure selector 82 serves to set the limits so that during an acceleration and deceleration condition the nozzles will not go above and below a predetermined value.

High-pressure fluid flowing through the fixed restriction 60 and line 62 also flows through a line 94, a fixed restriction 96 and into a line 98; from the line 98 the fluid normally flows through a retard solenoid valve 100, via a line 102, from which it flows to drain via line 78; the pressure in line 98 is fed to the chamber 90 of the most pressure selector 92 where its pressure is compared with the pressure is compared with the pressure in line 88. The most pressure selector 98 selects the higher of these two pressures and transmits a signal indicative of this pressure to end 104 of the spool 6 via line 106. A pressure signal from the acceleration schedule of the fuel control 5 is fed to the end 108 of the spool 6. An example of a pressure signal from the acceleration schedule of a fuel control that can be utilized with the present invention is shown in U.S. Pat. No. 3,348,560 which is herein incorporated by reference. Specifically, the pressure in line 266 of the 3,348,560 patent, supra, can be utilized for this purpose.

The system operates to reset the piston 32 until the pressures on ends 104 and 108 of the spool 6 are equal and the spool 6 is in balance.

The operation of a gas turbine engine incorporating the control for varying the area of the power turbine variable geometry according to the present invention will be explained with reference to the FIGS. Since a turboshaft engine is shown for the purpose of describing a preferred embodiment, the geometry which is varied to attain the objects of this invention is that of the power turbine stator. However, it will readily be understood by those skilled in the art that if the engine is a straight jet, the gas generator exhaust nozzle geometry will be varied to provide optimum engine performance.

To more fully understand the following description of the operation of a gas turbine engine incorporating our novel control (which description refers to various FIGS.) the following symbols are defined:

| Symbol | Definition |
| --- | --- |
| T.I.T / $\theta$ | Corrected gas generator turbine inlet temperature. |
| $W_t / \delta$ | Corrected engine fuel flow. |
| $P \cdot \sqrt{\theta}$ | |
| $A_n$ | Power turbine nozzle inlet area or jet exhaust nozzle area. |
| $N / \sqrt{\theta}$ | Corrected engine rotational speed. |
| $\alpha$ | Power lever position. |

Figure 1:
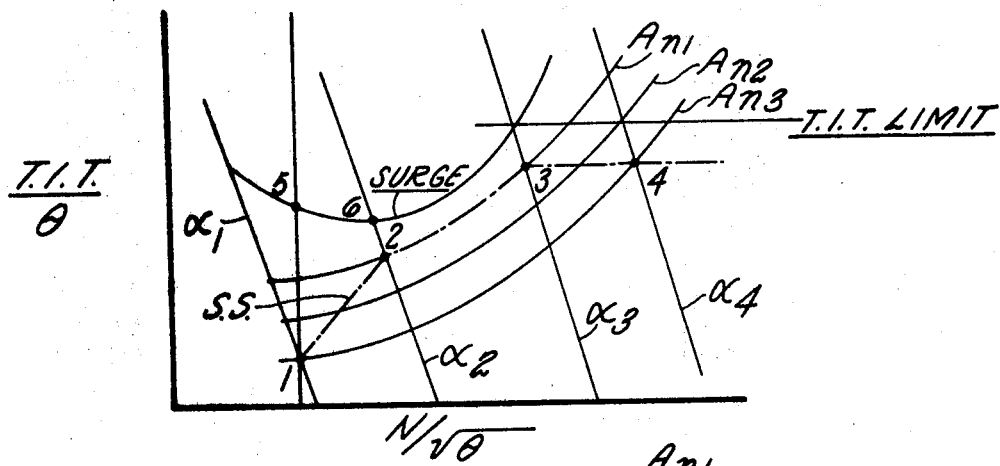
FIG. 1 is a graphical illustration showing the operating map of a gas turbine engine with variable geometry control over the speed range of the engine as a function of turbine inlet temperature. Point 1 represents engine idle, point 4 represents maximum engine speed, and points 2 and 3 are intermediate therebetween. All four points may be positions of the power lever.
Figure 2:
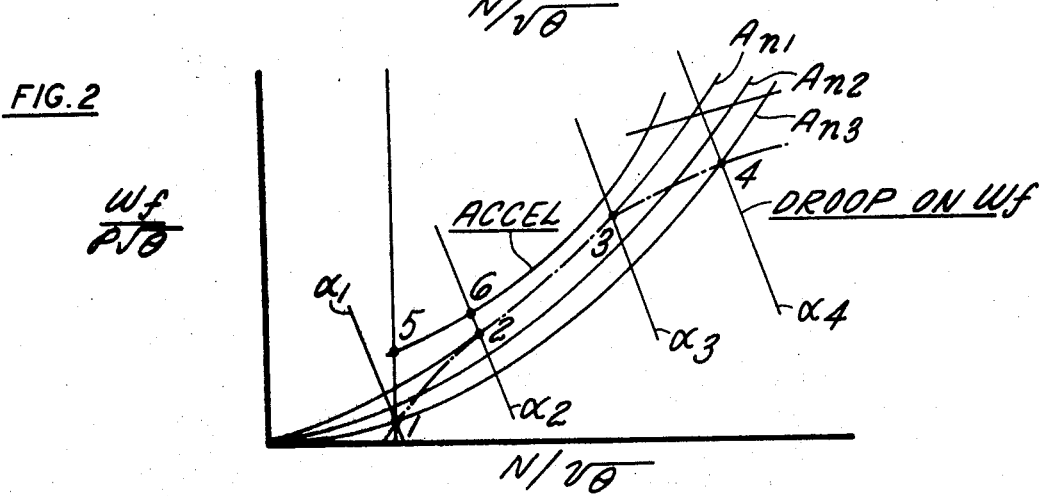
FIG. 2 is a graphical illustration showing the operating map of a gas turbine engine with variable geometry control over the speed range of the engine as a function of fuel flow.

Assume as a starting point that the engine is idling (points 1 on FIG. 1 through FIG. 3). If the power lever is suddenly shifted to a position represented by points 2, the valve means 2 will receive a change in pressure signal from the droop valve 58 on the end 104 of the spool 6 through selectors 82 and 90. The signal received will shift the spool towards the right, thereby uncovering land 36 on the high-pressure fluid port 16. Fluid flows into the line 38 via port 36 and into the chamber 33 in the cylinder 34. Fluid in the chamber 35 flows out through the line 30, through the port 28 and into the port 20 from which it flows to the drain line 52 via line 24. The piston 32 will thus move to the right, opening the area of the power turbine variable geometry (shown best in FIG. 5). As shown in FIG. 2, the fuel flow will increase to point 5 and will follow the acceleration schedule to point 6, from where it will follow the droop line $\alpha_2$ down to point 2. Likewise in FIG. 3, the variable geometry area will open to the stop line at point 5, follow the stop line to point 6 where it intersects droop line $\alpha_2$ and then close to point 2 by following the droop line $\alpha_2$ from point 6 to point 2. As will be understood by those skilled in the art, the engine accelerates faster because of the droop on the variable area. If droop were not provided and the area simply scheduled by the power lever, the area would close to point 2 immediately upon the power lever being moved and the engine acceleration time would be longer. As the piston 32 moves open and then towards closed as shown in FIG 3, the feedback valve 68 moves in relationship thereto. High-pressure fluid in the line 64 is metered by the port 66 of the valve 68 into the chamber 80 of the least pressure selector via the line 84. During acceleration the pressure in the chamber 86 will be greater than the pressure in the chamber 80, and, therefore, the least pressure selector will select the pressure in the chamber 80 and transmit it, via the line 88, to the chamber 90 of the most pressure selector 92. Since the solenoid valve 100 is open at all times except for deceleration, the pressure in the line 88 is greater than the pressure in the line 98. Therefore, the pressure from the line 88 will be transmitted, via the line 106, to the end 104 of the spool 6. The piston 32 will move until the pressure on the end 104 equals the pressure on the end 108 of the spool 6. The spool will then move to the null position, thus closing the ports 28, 36 and 46 and stopping movement of the piston 32.

During steady-state operation of the gas turbine engine the droop valve 58 controls the position of the piston 32. The position of the groove 54 within the window 56 is determined by pressure signals in the main control being fed to the ends of the spool 55. The signal fed to one end of the spool 55 is a function of the actual corrected speed, while the signal fed to the other end of the spool is a function of the desired corrected speed. Fluid from the high-pressure source flows to the drain line 52 via restriction 42, line 44, groove 40 in the window 48, line 50 and the droop valve 58. The pressure intermediate the two variable orifices is fed, via the line 87 to the chamber 86. Since the pressure in the chamber 86 is less than the pressure in the chamber 80 during steady-state operation, the least pressure selector 82 will transmit the pressure in the chamber 86 to the chamber 90 of the most pressure selector 92 via the line 88. From chamber 90 that pressure is fed to the end 104 of the spool 6 via the line 106. A pressure signal indicative of the acceleration schedule is also fed to the end 108 of the spool 6 by the fuel control. As described above, the spool 6 will move off the null position and the piston 32 will thereby be moved until the pressure signals on ends 104 and 108 of the spool 6 are equal at which time the spool 6 will move back to the null position and halt movement of the piston 32. That condition will occur when the actual corrected speed is equal to the desired corrected speed.

During deceleration, the solenoid vale 100 is closed. When the solenoid valve 100 closes, the pressure in the line 98 will be the highest pressure being fed to the chamber 90 of the most pressure selector 98 and will, therefore, be transmitted to the end 104 of the spool 6 via the line 106. This pressure will force the spool 6 to the left, thereby directing high-pressure fluid into the chamber 35 of the actuating means 31 and connecting the chamber 33 to drain. The piston 32 will then move towards the left which closes the power turbine variable area in order to rapidly decelerate the engine. When the pressures on the ends 104 and 108 are equal, the spool 6 will again return to the null position, thus stopping motion of the piston 32.

There has thus been described a preferred embodiment of a fuel control in accordance with the present invention. It should be understood by those skilled in the art that various changes and omissions in the form and detail thereof may be made therein without departing from the spirit and scope of the invention, which is to be limited only as set forth in the following claims:

What we claim as new and desire to secure by Letters Patent of the United States is:

1. Means for controlling the variable geometry of gas turbine engine having a mechanism for varying the power turbine stator geometry or the gas generator exhaust nozzle geometry and having a fuel control for regulating the flow of fuel thereto, comprising:

actuating means connected to said mechanism for changing the variable geometry;

first computing means for selecting the higher of two pressure signals fed thereto;

second computing means for selecting the lower of two pressure signals fed thereto, the output of said second computing means being fed to said first computing means as one of said two pressure signals;

feedback valve means responsive to the position of said actuating means for metering hydraulic fluid pressure to said second computing means as one of said two pressure signals;

a first control valve responsive to the position of a servovalve for metering hydraulic fluid;

a second control valve responsive to the speed error between the actual corrected speed and the desired corrected speed of the gas turbine engine for metering hydraulic fluid, said second control valve disposed in series with said first control valve, the fluid pressure between said control valves being fed to said second computing means as the other of said two pressure signals;

normally open solenoid valve means for metering hydraulic fluid pressure to said first computing means as the other of said two pressure signals, said solenoid valve closing in response to deceleration of the gas turbine engine; and servovalve means responsive to a function of the acceleration fuel flow to the gas turbine engine and to a signal, which is the higher of the two pressure signals, from said first computing means for controlling the position of said actuating means.

2. For a gas turbine type of power plant having variable area geometry and having a fuel control that includes means responsive to power plant operating conditions including a power lever, said fuel control having a speed droop on area control responsive to said power lever for scheduling the steady state and acceleration operation thereof, in combination with:

closed loop control means including means responsive to said acceleration schedule and said speed droop on area control for producing a first control signal for controlling the area of said variable geometry of the power plant; and feedback means responsive to the geometry change of said power plant for producing a second signal, said second signal modifying said first signal to limit nozzle area so as to maintain the operating conditions of the power plant at a predetermined value relative to said acceleration schedule.

3. For a gas turbine type of power plant as claimed in claim 2 in which the steady state operation is obtained by a speed droop on fuel flow control and said closed loop control means responds to said area droop control, said area droop control being matched to said droop schedule of said fuel control.

4. For a gas turbine type of power plant as claimed in claim 2 wherein said power plant operating conditions includes a function of turbine inlet temperature.

5. For a gas turbine type of power plant as claimed in claim 4 wherein said power plant operating conditions includes the power plant inlet temperature, the speed in revolutions per minute of the power plant and another condition of said power plant.

6. For a gas turbine type of power plant as claimed in claim 3 wherein said speed droop control includes means responsive to the difference between the actual speed in revolutions per minute of said power plant and the desired speed in revolutions per minute of said power plant.

7. For a gas turbine type of power plant as claimed in claim 3 wherein the variable geometry is the turbine stator.

8. For a gas turbine type of power plant as claimed in claim 3 wherein the variable geometry is the power plant exhaust nozzle.

9. For a gas turbine type of power plant as claimed in claim 3 including a hydraulic circuit, a source of high pressure and a drain, an actuator connected to the variable area geometry, valve means being positioned by a pressure signal indicative of said acceleration schedule and an opposing pressure signal indicative of the area of said variable area geometry for regulating the egress and ingress of flow from said source to drain to and from said actuator for controlling the position thereof.

10. For a gas turbine type of power plant as claimed in claim 9 including a droop valve connected to said valve means for further adjusting said opposing pressure signal to further control said valve means so as to effectuate changes of the position of said actuator.